FIG. 6

| NO. | J | K | L | M | N | F |
|---|---|---|---|---|---|---|
| 1 | 0 | 0 | Y | 1 | 1 | 0 |
| 2 | 1 | 1 | Y | 0 | 0 | 1 |
| 3 | 0 | 0 | Y | 0 | 0 | X |
| 4 | 1 | 1 | Y | 1 | 1 | $\overline{X}$ |
| 7 | 0 | 0 | $\overline{Y}$ | 0 | 1 | X Y |
| 8 | 0 | 1 | Y | 1 | 1 | $\overline{X}$ Y |
| 9 | 0 | 0 | Y | 0 | 1 | X $\overline{Y}$ |
| 10 | 0 | 1 | $\overline{Y}$ | 1 | 1 | $\overline{X}$ $\overline{Y}$ |
| 11 | 0 | 1 | Y | 0 | 0 | X + Y |
| 12 | 1 | 1 | $\overline{Y}$ | 0 | 1 | $\overline{X}$ + Y |
| 13 | 0 | 1 | $\overline{Y}$ | 0 | 0 | X + $\overline{Y}$ |
| 14 | 1 | 1 | Y | 0 | 1 | $\overline{X}$ + $\overline{Y}$ |
| 15 | 0 | 1 | Y | 0 | 1 | X$\overline{Y}$ + $\overline{X}$Y |
| 16 | 0 | 1 | $\overline{Y}$ | 0 | 1 | X Y + $\overline{X}$ $\overline{Y}$ |

FIG. 3

| NO. | A | B | F |
|---|---|---|---|
| 1 | 0 | 0 | 0 |
| 2 | 1 | 1 | 1 |
| 3 | 0 | 1 | X |
| 4 | 1 | 0 | $\overline{X}$ |
| 5 | Y | Y | Y |
| 6 | $\overline{Y}$ | $\overline{Y}$ | $\overline{Y}$ |
| 7 | 0 | Y | X Y |
| 8 | Y | 0 | $\overline{X}$ Y |
| 9 | 0 | $\overline{Y}$ | X $\overline{Y}$ |
| 10 | $\overline{Y}$ | 0 | $\overline{X}$ $\overline{Y}$ |
| 11 | Y | 1 | X + Y |
| 12 | 1 | Y | $\overline{X}$ + Y |
| 13 | $\overline{Y}$ | 1 | X + $\overline{Y}$ |
| 14 | 1 | $\overline{Y}$ | $\overline{X}$ + $\overline{Y}$ |
| 15 | Y | $\overline{Y}$ | X$\overline{Y}$ + $\overline{X}$Y |
| 16 | $\overline{Y}$ | Y | X Y + $\overline{X}$ $\overline{Y}$ |

FIG. 5

| NO. | J | K | L | M | N | F |
|---|---|---|---|---|---|---|
| 1 | 0 | 0 | Y | 0 | 0 | 0 |
| 2 | 1 | 1 | Y | 1 | 1 | 1 |
| 3 | 0 | 0 | Y | 1 | 1 | X |
| 4 | 1 | 1 | Y | 0 | 0 | $\overline{X}$ |
| 5 | 0 | 1 | Y | 0 | 1 | Y |
| 6 | 0 | 1 | $\overline{Y}$ | 0 | 1 | $\overline{Y}$ |
| 7 | 0 | 0 | Y | 0 | 1 | X Y |
| 8 | 0 | 1 | Y | 0 | 0 | $\overline{X}$ Y |
| 9 | 0 | 0 | $\overline{Y}$ | 0 | 1 | X $\overline{Y}$ |
| 10 | 0 | 1 | $\overline{Y}$ | 0 | 0 | $\overline{X}$ $\overline{Y}$ |
| 11 | 0 | 1 | Y | 1 | 1 | X + Y |
| 12 | 1 | 1 | Y | 0 | 1 | $\overline{X}$ + Y |
| 13 | 0 | 1 | $\overline{Y}$ | 1 | 1 | X + $\overline{Y}$ |
| 14 | 1 | 1 | $\overline{Y}$ | 0 | 1 | $\overline{X}$ + $\overline{Y}$ |

United States Patent Office 3,564,514
Patented Feb. 16, 1971

3,564,514
PROGRAMMABLE LOGIC APPARATUS
Dale C. Gunderson, St. Anthony Village, Minn., assignor to Honeywell Inc., Minneapolis, Minn., a corporation of Delaware
Continuation-in-part of application Ser. No. 618,486, Feb. 24, 1967. This application May 23, 1969, Ser. No. 827,207
Int. Cl. H03k 19/166, 19/20
U.S. Cl. 340—172.5      8 Claims

ABSTRACT OF THE DISCLOSURE

This disclosure shows two embodiments of a logic cell using two and five bistable memory cells per logic cell. The states of the memory cells can be changed or programmed to provide a variety of elementary logic functions.

CROSS REFERENCE TO RELATED APPLICATION

This application is a continuation-in-part of my copending application Ser. No. 618,486, filed Feb. 24, 1967, now abandoned.

BACKGROUND OF THE INVENTION

This invention pertains to computing apparatus and more specifically to logic systems which can be programmed to provide different logic functions.

In the past, logic systems for use with computing or data processing apparatus and systems have generally been fabricated from semiconductor devices and in some cases from magnetic cores. One general characteristic of prior art logic systems is that they were preprogrammed or fixed wired so that the output signal is a particular unique function of the input signals. The logic function performed by the logic system could not be changed without rewiring or redesigning the system. Thus, in prior art logic systems the system could perform only one logic function and it was neither convenient nor feasible to alter the function performed by the logic system. Accordingly, in prior art systems it was necessary to provide individual logic systems to perform each individual logic function.

SUMMARY OF THE INVENTION

This invention overcomes many of the disadvantages of the prior art by providing a logic system which is freely alterable under the control of a program or program device or a similar control to provide a wide variety of logic functions. Of course, the structure in accordance with the invention can perform only one logic function at any particular time; however, where different logic functions are to be performed sequentially, the logic array can be reprogrammed to perform the second logic function after the first logic function is completed.

A programmable logic array is constructed in accordance with this invention by providing a plurality of storage or memory cells and by storing a pattern of logic signals in the memory cells. The logic function is generated by interrogating the memory cells to provide an output signal which is dependent upon the particular pattern of stored logic signals. Two species of the invention are shown. One species uses two memory cells per logic cell and the other species uses five memory cells per logic cell. One logic variable, Y, is stored in the memory cells together with a pattern of logic signals. The memory cells are interrogated in accordance with the logic state of a second variable, X, to provide an output signal which is a function of the variables X and Y. Accordingly, it is an object of this invention to provide a novel logic arrangement.

It is a further object of this invention to provide a logic system in which the logic elements can be programmed to provide various logic functions.

Figure 1:
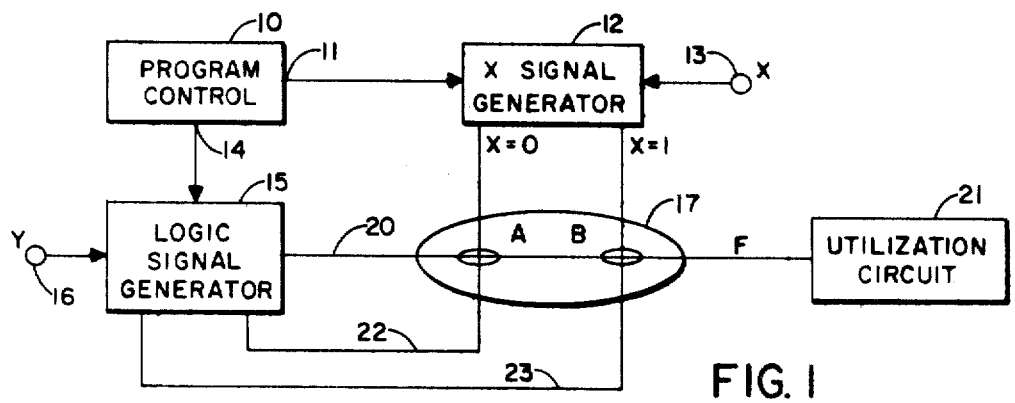
Figure 4:
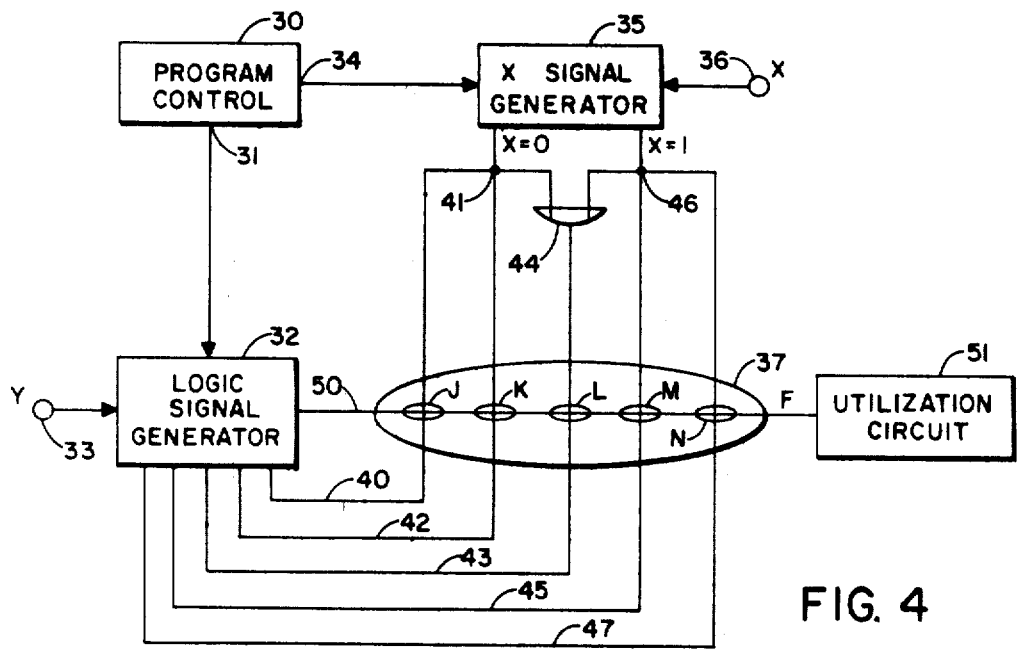
Figure 2:
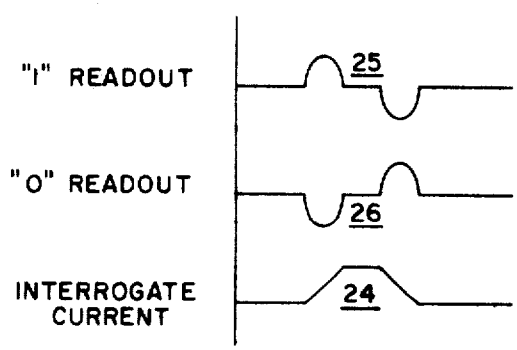
Figure 7:
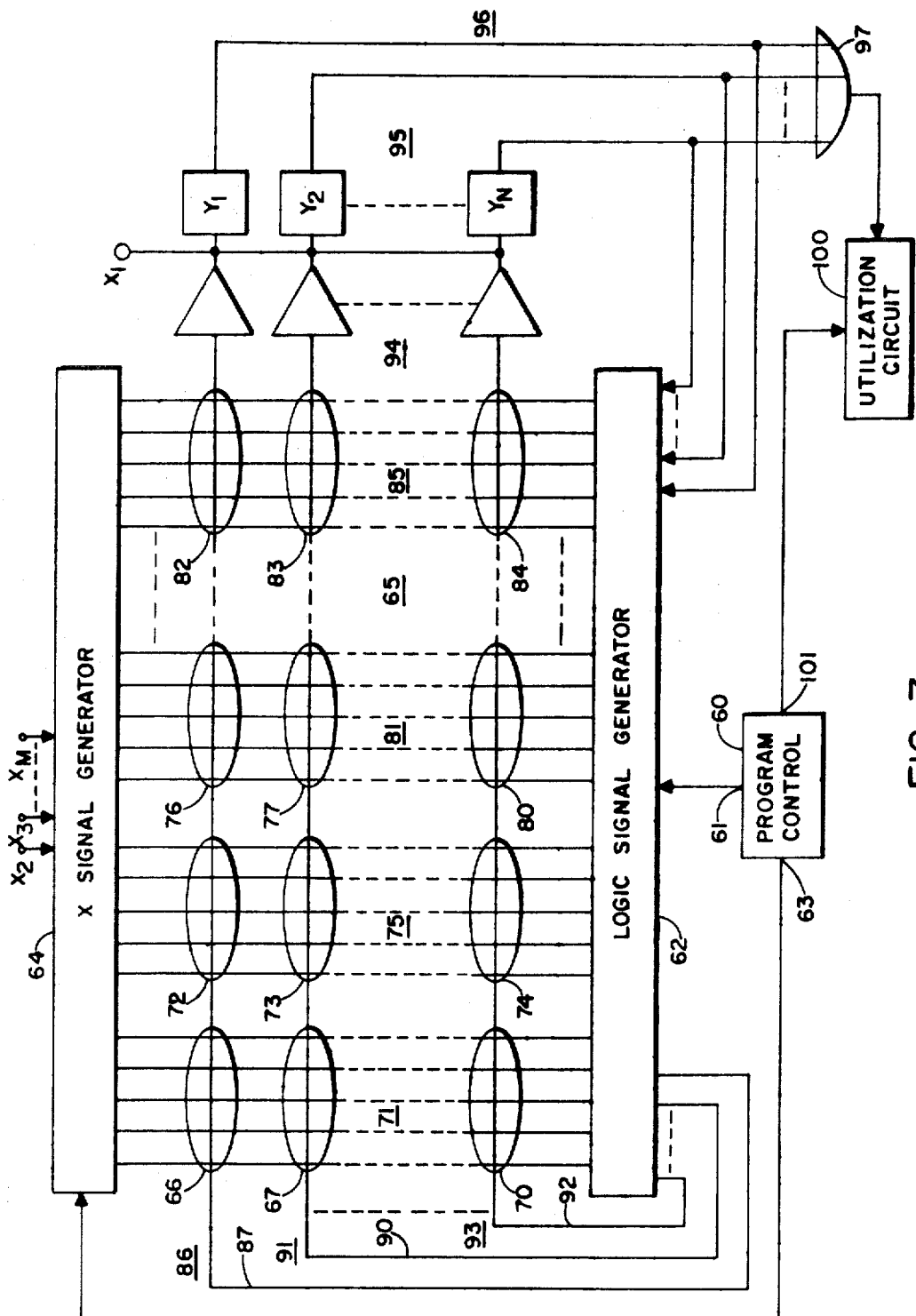
Figure 8:
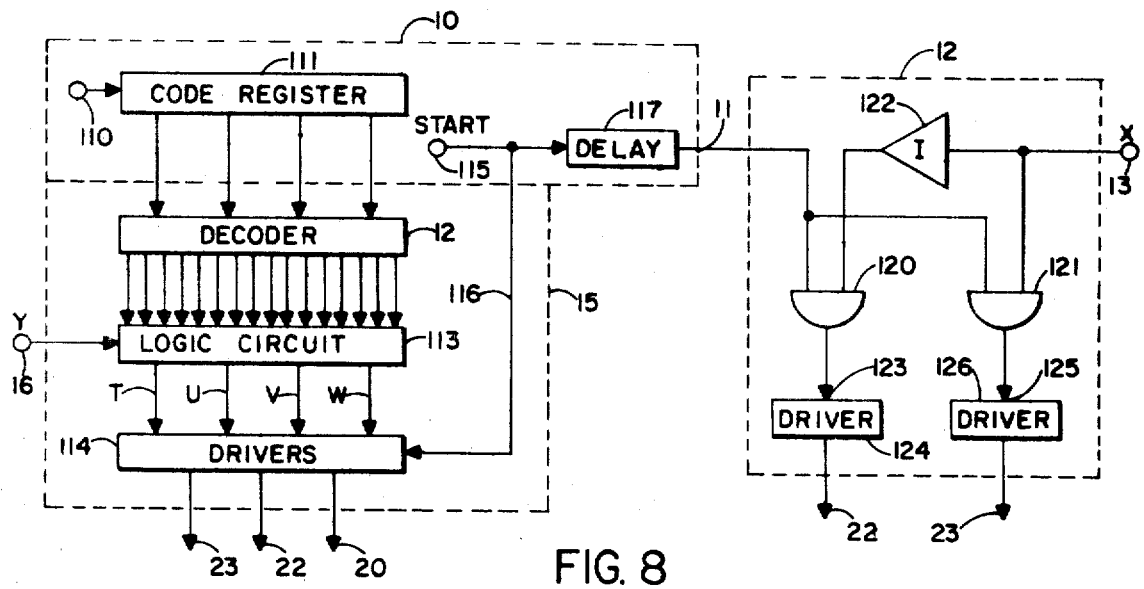
Figure 10:
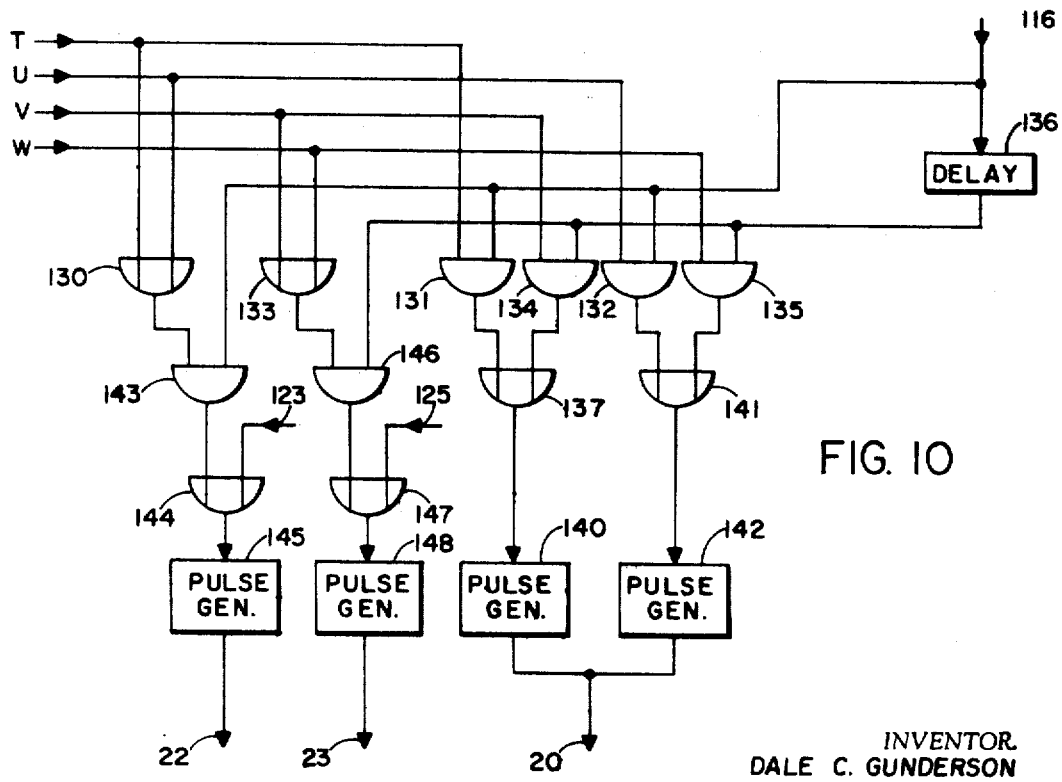
Figure 9:
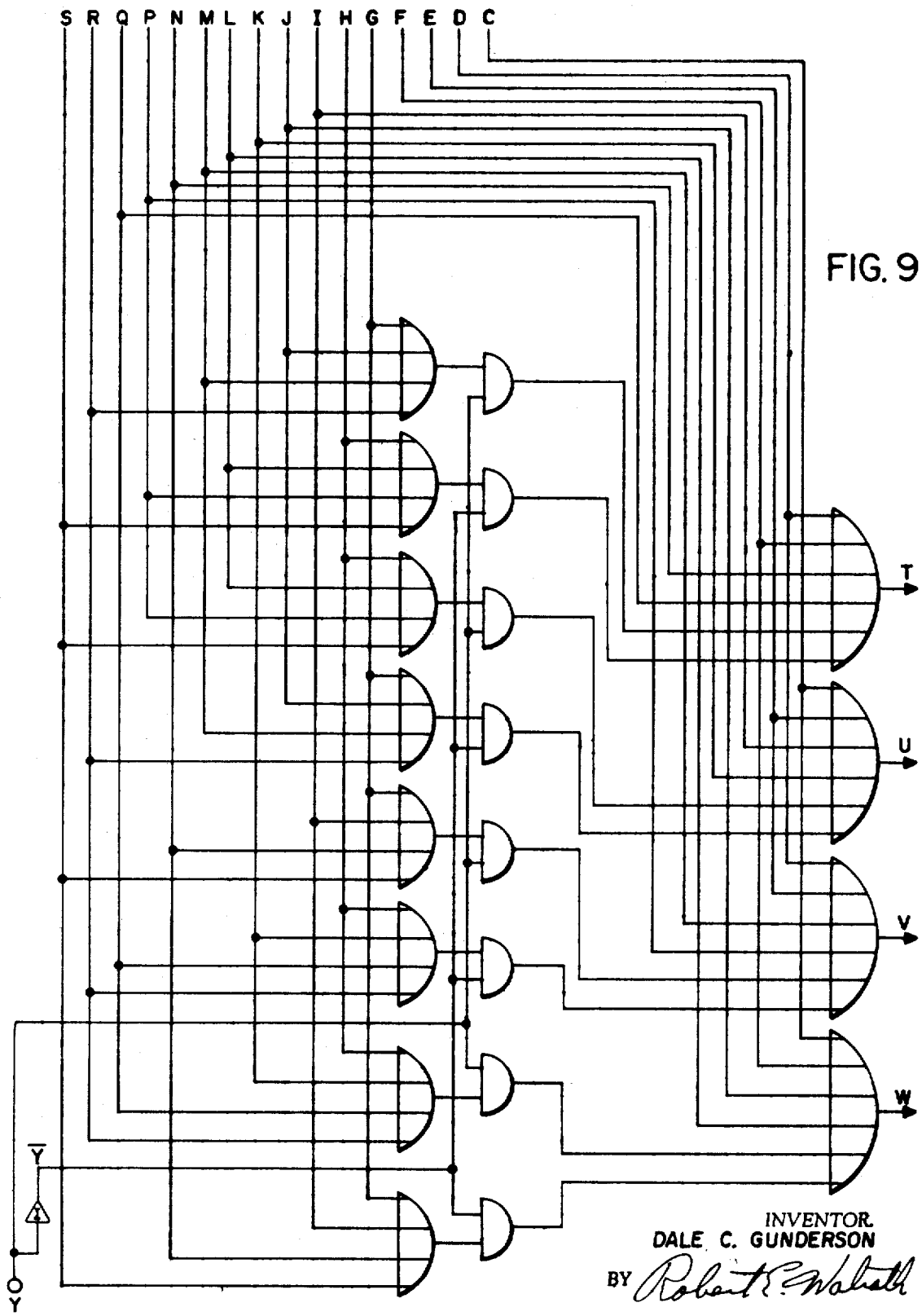

These and other objects and advantages of this invention will become evident to those skilled in the art upon a reading of this specification and the appended claims in conjunction with the drawings, of which:

FIG. 1 is a schematic illustration of one embodiment of this invention;
FIG. 2 is a graph showing signal wave forms;
FIG. 3 is a table illustrating the logic functions which can be generated by the structure of FIG. 1;
FIG. 4 is a schematic illustration of a second embodiment of this invention;
FIGS. 5 and 6 are tables illustrating the logic functions which can be generated by the structure of FIG. 4;
FIG. 7 is a schematic illustration of a logic system constructed in accordance with the invention for generating complex logic functions;
FIG. 8 is a block diagram illustrating a portion of FIG. 1 in greater detail;
FIG. 9 is a logic diagram of a portion of FIG. 8; and
FIG. 10 is a logic diagram of another portion of FIG. 8.

STRUCTURE OF FIG. 1

In FIG. 1 there is shown a control means or program control 10 which may contain a program device or stored program or both. Program control 10 has a first output terminal or means 11 which is connected to an input of an interrogation means, logic signal generating means, signal generating means, or X signal generator 12. An input terminal or means 13 is connected to a second input of signal generator 12. A second output terminal or means 14 of program control 10 is connected to an input of a logic signal generating means, signal generating means, or logic signal generator 15. As input terminal or means 16 is connected to a second input of logic signal generator 15. Terminal 13 receives an X input signal and terminal 16 receives a Y input signal. Program control 10. X signal generator 12, and logic signal generator 15 are shown in greater detail in FIGS. 8, 9, and 10 which are described hereinafter.

In FIG. 1 there are further shown two ellipses labeled A and B. A and B schematically represent memory or storage cells or means of a type known in the art. In the preferred embodiment of this invention, the memory means is a plated wire memory, or similar memory devices having at least two stable storage states, such as that illustrated and described in an article by I. Danylchuk, A. J. Perneski and M. W. Sagal, "Plated Wire Magnetic Film Memories," 1964 Proceedings of the Intermag Conference (International Conference on Nonlinear Magnetics sponsored by IEEE), Washington, April 1964, page 5-4-1. Plated wire or similar memory devices are preferred because the structure of FIG. 4 depends upon signal cancellation of output signals from the memory cells and because plated wire can be read nondestructively.

Storage cells A and B are enclosed within a larger ellipse 17 which schematically represents a logic cell. In FIG. 1 logic cell 17 includes storage cells A and B. Signal generator 15 has an output means or terminal connected by a lead, line, wire, or conductor 20 to cells A and B of logic cell 17. Lead 20 is used for storing signals in the storage cells A and B. When plated wire is used for storage cells A and B, lead 20 is the sense wire or line. Sense wire 20 is also connected to supply the logic output F to an output means or utilization circuit 21. A line, wire, lead, or conductor 22 which represents the word line in a plated wire memory links storage cell A and is connected to outputs of logic signal generator 15 and X signal generator 12. Another line, wire, lead, or conductor 23 which represents another plated wire word line links storage cell B and is connected to outputs of logic signal generator 15 and X signal generator 12.

OPERATION OF FIG. 1

In FIG. 1 logic signals are stored in cells A and B in response to coincident application of signals to lines 20, 22, and 23 by logic signal generator 15 in the usual manner for plated wire memories. Cells A and B are interrogated by signals applied to lines 22 and 23 by X signal generator 12. When plated wire is used as the memory element of cells A and B, the wave forms of FIG. 2 are applicable.

The signal levels of "1" and "0" signals are completely arbitrary. Any signals may be defined as "1" and "0" signals as long as they can be differentiated. Accordingly, for the purposes of explaining FIG. 1, assume that wave form 25 of FIG. 2 represents a "1" logical signal and wave form 26 represents a "0" logical signal. Wave form 24 of FIG. 2 represents the wave form of the current applied by X signal generator 12 to interrogate storage cells A and B. When storage cell A or B is interrogated by signal generator 12 by the application of current wave form 24 to either of lines 22 or 23, wave form 25 or wave form 26 will appear on line 20 as an output wave form. The particular output wave form will depend upon the direction of magnetization or polarization of the storage cell which was interrogated.

FIG. 3 shows a table of logic functions and the appropriate signals which are stored in cells A and B to provide each function. For the purposes of explanation, it will be assumed that the logic cell 17 is to be programmed to provide an AND function $F=XY$ which is shown as function No. 7 of FIG. 3. The Y signal is received by input terminal 16 and is applied to signal generator 15. Control 10 provides timing signals and coded signals which indicate the particular logic function to be performed. For example, a four-bit binary code could be used to uniquely identify each of the sixteen functions listed in FIG. 3. Control 10 will provide a signal to signal generator 15 which indicates that logic cell 17 is to be programmed to provide function No. 7 in the example chosen above. Signal generator 15 will decode the signal from control 10 and will magnetize memory cells A and B in the appropriate directions to generate function No. 7 when logic cell 17 is interrogated. The Y input signal or variable is stored in cell B. Cell A will be magnetized in the sense or direction which will provide a "0" output signal when it is interrogated. This may be referred to as storing a "0" in cell A. The X signal or variable is received at input terminal 13 and is applied to X signal generator 12. Control 10 will next provide an enable, timing, or control signal to X signal generator 12 which causes X signal generator 12 to provide an interrogate current on line 22 if X is a logical "0" or to provide an interrogate current on line 23 if X is a logical "1."

If $X=0$, cell A will be interrogated. As a "0" signal was stored in cell A, the output signal will be a "0" or wave form 26 of FIG. 2. However, if $X=1$, cell B will be interrogated. As the logical Y signal was stored in cell B, the output signal will be a "0" if $Y=0$ and a "1" if $Y=1$. Thus, it is seen that the output signal F on line 20 is a logical AND of X and Y when Y is stored in cell B and "0" is stored in cell A.

In FIG. 3 the logic signals stored in cells A and B are listed in columns headed A and B, respectively, and the corresponding logic function is given in the column headed F. To form the function $F=0$, it is seen from FIG. 3 that logical "0" signals are stored in both cells A and B. This function may be used whenever it is desired to provide a "0" output signal irrespective of the logic states of the X and Y signals. Similarly, the function $F=1$ is provided by storing "1" signals in each of cells A and B. Logic function $F=X$ can be generated by storing a "0" in cell A and a "1" in cell B. When $X=0$, cell A will be interrogated to provide a "0" signal on line 20, and when $X=1$, cell B will be interrogated to provide a "1" signal on line 20. To provide the function $F=\overline{X}$ a "1" signal is stored in cell A and a "0" signal is stored in cell B. With this arrangement of signals stored in cells A and B, the output signal is the logical inverse of X. In functions 1–4 of FIG. 3 the Y variable is ignored.

The function $F=Y$ can be performed by storing Y in both cells A and B so that the output signal will be Y irrespective of whether X is "0" or "1." The logic function $F=\overline{Y}$ can be generated by storing $\overline{Y}$ (the logical inverse of Y) in each of cells A and B. The AND function, No. 7 in FIG. 3, has already been described. Functions 8, 9, and 10 are variations of the AND function and are provided by storing Y or its logical inverse and "0" in cells A and B. The OR function, functions 11, 12, 13, and 14, are provided by storing Y or its logical inverse and "1" in cells A and B. Logic functions 15 and 16 are exclusive OR functions. They are generated by storing Y in one of cells A or B and the logical inverse of Y in the other cell.

Utilization circuit 21 receives the output signal on line 20. As was mentioned hereinbefore, the output signal will be either wave form 25 or wave form 26 of FIG. 2. A circuit which can discriminate between such wave forms is shown in a patent to R. B. Jaeger, 3,417,258.

It should be noted that during the storage cycle when signal generator 15 is storing signals in cells A and B, signal generator 12 and utilization circuit 21 must provide current sinks for the signals applied to leads 20, 22 and 23. Similarly, signal generator 15 must provide a current sink for the interrogation current supplied by signal generator 12. Alternatively, logic signal generator 15 and X signal generator 12 could be connected to lines 22 and 23 on the same side of logic cell 17 with the other end of lines 22 and 23 being returned to a common conductor. This type of connection requires switches or logic circuitry to connect lines 22 and 23 to the logic signal generator 15 during the storage or programming mode of operation and to X signal generator 12 during the interrogate mode of operation. An example of this alternative construction is illustrated in FIG. 10. Similarly, logic signal generator 15 and utilization circuit 21 could be connected to line 20 on the same side of logic cell 17 with a switching circuit to alternatively connect line 20 to one of them.

STRUCTURE OF FIG. 4

In FIG. 4 there is shown a block 30 labeled program control which is similar to program control 10 of FIG. 1. An output 31 of program control 30 is connected to an input of a logic signal generator 32. Logic signal generator 32 is similar to logic signal generator 15 of FIG. 1. An input terminal 33 is connected to receive the Y input signal and is further connected to an input of logic signal generator 32. Program control 30 has a second output 34 which is connected to an input of an X signal generator 35 which is similar to X signal generator 12 of FIG. 1. An input terminal 36 is connected to receive the X input signal and is further connected to an input of X signal generator 35.

There is further shown five storage cells J, K, L, M and N. Each of the cells J–N is schematically represented by an ellipse. All of cells J–N are included within logic cell 37 which is schematically represented by an ellipse enclosing all of the storage cells J–N. Storage cells J–N may each be segments of plated wire similar to cells A and B of FIG. 1.

A line or lead 40 represents the word line associated with storage cell J. One end of line 40 is connected to an output of signal generator 32 and the other end is connected to a junction point 41 which is further connected to signal generator 35. A line 42 represents the word line associated with storage cell K. One end of line 42 is connected to an output of signal generator 32 and the other end of line 42 is connected to junction point 41. A line 43 represents the word line associated with storage cell L. One end of line 43 is connected to an output of signal generator 32 and the other end of line 43 is connected to an output of an OR gate 44. A line 45 represents the word line associated with storage cell M. One end of line 45 is connected to an output of signal generator 32 and the other end of line 45 is connected to a junction point 46 which is further connected to a second output of signal generator 35. A line 47 represents the word line associated with storage cell N. One end of line 47 is connected to an output of signal generator 32 and the other end of line 47 is connected to junction point 46. Junction point 46 is further connected to a first input of OR gate 44 and junction point 41 is further connected to a second input of OR gate 44.

A sense line 50, associated with each of storage cells J–N has one end connected to an output of signal generator 32 and the other end connected to an input of a utilization circuit 51 which may be similar to utilization circuit 21 of FIG. 1.

OPERATION OF FIG. 4

Logic cell 37 of FIG. 4 operates on a majority logic principle by using the signal cancellation characteristics of plated wire. The signals stored in storage cells J, K, M, and N are always either "1" or "0." The logic signal stored in storage cell L is always either Y or its logical inverse $\bar{Y}$. When X is a "0" signal an interrogate current is transmitted to junction point 41 and a first group of storage cells, J, K, and L, are interrogated simultaneously. For example, if "0" signals are stored in cells J and L and a "1" signal is stored in cell K, the readout signals from cells J and K will be equal and opposite so that they will cancel. However, the readout signal from cell L will represent a "0" so that the output signal will be a "0." Thus, if a majority of the three cells which are simultaneously interrogated contain stored "0" signals, the output will be a "0" and if a majority of the interrogated cells contain "1" signals, the output signal will be a "1" signal. In a similar manner if the the X input signal is a "1" signal, a second group of storage cells L, M, and N will be simultaneously interrogated. It should be noted that cell L is in both the first and second groups so that it is interrogated each time.

Other than the differences noted above, the operation of FIG. 4 is the same as the operation of FIG. 1. However, the internal logic structure of the signal generator 32 would be different. The logic functions generated by the structure of FIG. 4 are illustrated in FIG. 5.

As an example, it will be assumed that it is desired to generate the logic function indicative of $F=XY$ or the logical AND function. The AND function is illustrated as function No. 7 in FIG. 5. To generate this function "0" signals are stored in cells J, K, and M. The Y input signal is stored in cell L and a "1" signal is stored in cell N. It should be noted that the signals stored in cells M and N may be exchanged and the signals stored in cells J and K may also be exchanged. If $X=0$, the output signal will be a "0" as the majority of the interrogated cells will contain "0" signals. If the X input signal is a "1," the output signal will be a "0" if $Y=0$ and a "1" if $Y=1$ because the output signals from cells M and N cancel. The remaining functions illustrated in FIG. 5 are self-explanatory from the explanation of FIG. 1 and from the explanation of the operation of FIG. 4 programmed to provide an AND function.

It should be noted that in the arrangement described above, the exclusive OR functions cannot be generated. That is, there is no arrangement of signals that can be stored in logic cell 37 which will provide an exclusive OR function when they are interrogated by signal generator 35. To overcome this deficiency it is possible to redefine the logic signals such that the exclusive OR function can be provided by logic cell 37.

FIG. 6 illustrates a logic function table which also can be used with logic cell 37 of FIG. 4. With respect to FIG. 6 the logic functions are defined in the following manner. When $X=0$, the output function is true or "1" when the output signal is waveform 25 of FIG. 2. When $X=1$, the output is true or "1" when the output signal is waveform 26 of FIG. 2. It should be noted that when the output signals are interpreted in this manner, the functions $F=Y$ and $F=\bar{Y}$ cannot be generated. As an illustrative example of the operation of the invention in this manner, refer to the AND function illustrated in FIG. 6 as logic function No. 7. To generate this function, logic "0" signals are stored in storage cells J, K, and M. A logic "1" signal is stored in cell N and $\bar{Y}$ is stored in cell L. In performing an AND function the output should always be "0" when either X or Y is "0." When $X=0$, storage cells J, K, and L are simultaneously interrogated. As cells J and K contain signals which will provide an output waveform similar to waveform 26 of FIG. 2, the output signal will be interpreted as a "0." However, when $X=1$, storage cells L, M, and N are simultaneously interrogated. Thus, the logic state of the output signal will depend upon the $\bar{Y}$ signal because the "1" and "0" stored in cells M and N, respectively, will cancel. If $\bar{Y}=1(Y=0)$, the output waveform will be waveform 25 which has been defined as "0." If $\bar{Y}=0(Y=1)$, the output waveform will be waveform 26 which has been defined as "1." The structure of FIG. 4 operates in a similar manner to generate the other functions listed in FIG. 6.

COMPARISON OF FIGS. 1 AND 4

The structure of FIG. 1 has the obvious advantage of requiring fewer memory or storage cells. However, the logic signal generator 15 must be designed so that Y or its inverse $\bar{Y}$ can be stored in either of cells A or B. In the structure of FIG. 4 the Y or $\bar{Y}$ signal is always stored in storage cell L which will somewhat simplify the logic circuitry in signal generator 32.

STRUCTURE OF FIG. 7

FIG. 7 shows a system for generating complex logic functions of a set of input variables. In FIG. 7 there is shown a program control 60 similar to program control 30 of FIG. 4. A first output 61 of control 60 is connected to an input of a logic signal generator 62 similar to logic signal generator 32 of FIG. 4. A second output 63 of control 60 is connected to an input of an X signal generator 64 which is similar to X signal generator 35 of FIG. 4. A set of input variables $X_2, X_3 \ldots X_M$ are connected to X signal generator 64 in a manner similar to that of the X variable applied at terminal 36 of FIG. 4.

A two-dimensional array of logic cells 65 is shown with the appropriate connections to the signal generators 62 and 64. The logic cells are shown schematically as ellipses similar to the logic cell 37 of FIG. 4. Logic cells 66, 67, and 70 are connected to comprise a first column 71 of two-dimensional array. Each of logic cells 66, 67, and 70 contains 5 storage cells similar to cells J, K, L, M, and N of logic cell 37 of FIG. 4. Each of the corresponding storage cells in each of the logic cells in a given column is linked by one conductor, which is similar to one of lines 40, 42, 43, 45, and 47 of FIG. 4, and which has its ends connected to signal generators 62 and 64. Logic cells 72, 73, and 74 are connected to comprise a second column 75 of the array. Logic cells 76, 77, and 80 are connected to comprise a third column 81 of the array. Logic cells 82, 83, and 84 are connected to comprise a (M–1) column 85 of the array. An arbitrary number of columns may be inserted between the third column 81 and the (M–1) column 85.

Logic cells 66, 72, 76, and 82 comprise a first row 86 of the two-dimensional array. Each of the logic cells in a given row are linked by one conductor or line which is equivalent to line 50 of FIG. 4. A line 87 links all of the logic cells of row 86. A conductor 90 links all of the logic cells 67, 73, 77, and 83 which comprise a second row 91 of the array. A line 92 links each of logic cells 70, 74, 80, and 84 which comprise an Nth row 93 of the array. One end of each of lines 87, 90, and 92 is connected to signal generator 62. The other ends of lines 87, 90, and 92 are connected to provide a set of output signals from the array.

The output ends of lines 87, 90, and 92 are connected to a set of sensing means such as sense amplifiers or bipolar pulse discriminators 94 which discriminate between "1" and "0" signals. The outputs of the sensors 94 are connected to the inputs of a register 95. Register 95 may be a set of flip-flops $Y_1, Y_2 \ldots Y_N$ which are set by the output signals from the sensing means 94. The output signals from register 95 are applied by a set of leads 96 to inputs of signal generator 62 and are further applied to the inputs of an OR gate 97. An output of OR gate 97 is connected to an input of a utilization circuit 100. Program control 60 has an output 101 which is connected to a second input of utilization circuit 100. An $X_1$ input terminal is connected to the input of register 95.

OPERATION OF FIG. 7

The operation of FIG. 7 will be explained with reference to a specific example. It will be assumed that the array of FIG. 7 is to be programmed to solve the logic function $$F = X_1\bar{X}_2X_3\bar{X}_4 + \bar{X}_1X_2X_3\bar{X}_4 + X_1X_2\bar{X}_3X_4 \tag{1}$$

where the X's are the input variables. This equation can be simplified by factoring $X_3\bar{X}_4$ from the first two quantities to provide $$F = (X_1\bar{X}_2 + \bar{X}_1X_2)X_3\bar{X}_4 + X_1X_2\bar{X}_3X_4 \tag{2}$$

Note that the expression in the parenthesis requires an exclusive OR function. Under these circumstances it would be desirable to use the logic scheme illustrated in FIG. 6 as it includes an exclusive OR function. This equation can be solved through the use of logic cells 66, 67, 72, 73, 76, and 77. Accordingly, the other logic cells shown in FIG. 7 are unnecessary and will not be used in this example.

The first step is to form the subresults $$Y_{11} = X_1\bar{X}_2 + \bar{X}_1X_2 \tag{3}$$

and $$Y_{21} = X_1X_2 \tag{4}$$

where the first subscript on the Y's refers to the row and the second subscript refers to the column. The first step in forming the subresults (3) and (4) is to load the variable $X_1$ into register 95. The outputs of register 95 are coupled to the inputs of signal generator 62. On a command from control 60, signal generator 62 will store $X_1$ in logic cell 66 together with a pattern of 1's and 0's so that logic cell 66 is programmed to provide function No. 15 of FIG. 6. Similarly, $\bar{X}_1$ will be stored in logic cell 67 together with a pattern of 1's and 0's to provide logic function No. 7 of FIG. 6. The next step in forming $Y_{11}$ and $Y_{21}$ is to interrogate logic cells 66 and 67 with the $X_2$ variable. Control 60 will provide a command signal to signal generator 64 which will cause signal generator 64 to interrogate logic cells 66 and 67 with the $X_2$ signal. The output signals will be received by register 95 and stored in locations $Y_1$ and $Y_2$. Thus, the subresult $Y_{11}$, Equation 3, will be stored in location $Y_1$ of register 95 and subresult $Y_{21}$, Equation 4, will be stored in location $Y_2$. Again the outputs of register 95 will be applied to the inputs of signal generator 62.

The second step in forming function F is to form the subresults $$Y_{12} = (X_1\bar{X}_2 + \bar{X}_1X_2)X_3 = Y_{11}X_3 \tag{5}$$

and $$Y_{22} = X_1X_2\bar{X}_3 = Y_{21}\bar{X}_3 \tag{6}$$

These subresults are formed by loading $\bar{Y}_{11}$ in logic cell 72 together with a pattern of 1's and 0's to provide logic function No. 7 of FIG. 6. Similarly, $Y_{21}$ is stored in logic cell 73 together with a pattern of 1's and 0's so that logic cell 73 provides logic function No. 9 of FIG. 6. Signal generator 64 then interrogates column 75 in accordance with the $X_3$ signal and the $Y_{12}$ and $Y_{22}$ output signals are stored in register 95.

The third step in forming function F is to form the subresults $$Y_{13} = (Y_1\bar{Y}_2 + \bar{X}_1X_2)X_3\bar{X}_4 = Y_{12}\bar{X}_4 \tag{7}$$

and $$Y_{23} = X_1X_2\bar{X}_3\bar{X}_4 = Y_{22}X_4 \tag{8}$$

The subresult $Y_{13}$ is formed by storing $Y_{12}$ in logic cell 76 together with a pattern of 1's and 0's so that logic cell 76 is programmed to provide logic function No. 9 of FIG. 6. Similarly $\bar{Y}_{22}$ is stored in logic cell 77 together with a pattern of 1's and 0's so that logic cell 77 is programmed to provide logic function No. 7 of FIG. 6. Column 81 is then interrogated by signal generator 64 in accordance with the $X_4$ signal. The results are stored in register 95.

The output signals from register 95 are applied to the inputs of OR gate 97. OR gate 97 OR's $Y_{13}$ and $Y_{23}$ to provide the function F at its output. Program control 60 provides an output signal to utilization circuit 100 to indicate that the output function F is available.

STRUCTURE OF FIG. 8

FIG. 8 shows program control 10, logic signal generator 15, and X signal generator 12 of FIG. 1 in greater detail. A terminal 110 is connected to an input of a block 111 labeled code register. Code register 111 has four outputs connected to a block 112 labeled decoder. Decoder 112 has 16 outputs connected to a block 113 labeled logic circuit. Y input terminal 16 is connected to another input of logic circuit 113 which has four outputs connected to a block 114 labeled drivers. Drivers 114 has three outputs connected to conductors 20, 22, and 23. A start terminal 115 is connected by a conductor 116 to another input of drivers 114. Decoder 112, logic circuit 113, and drivers 114 comprise logic signal generator 15. Where appropriate, the same numbers used in FIG. 1 are repeated in FIG. 8 and subsequent figures.

Start terminal 115 is further connected to an input of a delay means 117 which has an output connected to a first input of AND gates 120 and 121. X input terminal 13 is connected to a second input of AND gate 121 and to an input of an inverter 122 which has an output connected to a second input of AND gate 120. AND gate 120 has an output connected to an input 123 of a driver 124 which has an output connected to conductor 22. AND gate 121 has an output connected to an input 125 of a driver 126 which has an output connected to conductor 23. AND gates 120 and 121, inverter 122, and drivers 124 and 126 comprise X signal generator 12. Code register 111 and delay 117, together with input terminals 110 and 115, comprise program control 10.

OPERATION OF FIG. 8

An input signal applied to terminal 110 sets code register 111 to provide a particular code depending upon the logic function to be performed. A four bit code is sufficient to uniquely specify 16 different logic functions. Thus, a four bit code is suitable to uniquely specify each of the 16 logic functions illustrated in FIG. 3. The four bit code contained in code register 111 is applied to the input of decoder 112. Decoder 112 decodes the four bit input thereto into 16 discrete outputs. Each unique code applied to decoder 112 causes one of the 16 output lines to be selected. Examples of suitable decoders are shown in FIG. 17-2 of R. S. Ledley, Digital Computer and Control Engineering, McGraw-Hill, 1960, page 548. Any other suitable decoders may also be used. The 16 outputs from decoder 112 are combined with the Y input signal provided at terminal 16 in logic circuit 113. Logic circuit 113 provides four outputs labeled T, U, V, and W. When a "1" signal occurs at output T, a "1" is to be stored in cell A. When a "1" signal occurs at output U, a "0" is to be stored in cell A. When a "1" signal occurs at output V, a "1" is to be stored in cell B. When a "1" signal occurs at output W, a "0" is to be stored in cell B. For any given logic function to be performed, two of outputs T–W will be "1." The particular outputs that are "1" depends upon the logic function to be performed and the logic state of the Y variable. The storage operation is initiated by a start pulse at terminal 115 which is coupled to drivers 114 to energize the appropriate drivers to store logic signals in accordance with the T–W outputs from logic circuit 113. Logic circuit 113 and driver 114 will be explained more fully in connection with FIGS. 9 and 10.

After logic signal generator 15 causes cells A and B to be magnetized, it is necessary to interrogate cells A and B to provide an output signal to utilization circuit 21. The start pulse applied at terminal 115 is delayed by delay device 117 for a sufficient time for the storage operation to be completed. The pulse continues from delay device 117 to the inputs of AND gates 120 and 121. The X input variable is applied to the second input of AND gate 121. $\bar{X}$ is provided by inverter 122 and is applied to the second input of AND gate 120. When the pulse from delay device 117 occurs, one of AND gates 120 and 121 will provide an output signal to drivers 124 and 126, depending upon whether X is a "0" or a "1." For example, if X is a "1," AND gate 121 will provide an output signal to energize driver 126. Driver 126 will provide an interrogate pulse or read pulse on conductor 23 to interrogate cell B. Similarly, if X is a "0," AND gate 120 will provide an output pulse to energize driver 124 which will provide an interrogate or read pulse on conductor 22 to interrogate cell A.

As will become evident in connection with FIG. 10, drivers 124 and 126 may be incorporated into drivers 114. When the drivers are combined, one end of conductors 22 and 23 must be grounded or connected to provide a closed signal path.

FIG. 9

Logic circuit 113 is illustrated in detail in FIG. 9. Logic circuit 113 accepts 16 inputs labeled C–S from decoder 112 which correspond to the 16 functions illustrated in FIG. 3. Logic circuit 113 provides outputs T, U, V, and W in accordance with the following four logic equations:

$$T = D + F + N + Q + (G + J + M + R)$$
$$Y + (H + L + P + S)\bar{Y} \quad (9)$$
$$U = C + E + I + K + (H + L + P + S)$$
$$Y + (G + J + M + R)\bar{Y} \quad (10)$$
$$V = D + E + M + P + (G + I + N + S)$$
$$Y + (H + K + Q + R)\bar{Y} \quad (11)$$
$$W = C + F + J + L + (H + K + Q + R)$$
$$Y + (G + I + N + S)\bar{Y} \quad (12)$$

Equations 9–12 can be determined by inspection from FIG. 3. For example, when T is a "1," a "1" is to be stored in cell A. By inspecting the column indicating the signal to be stored in cell A (FIG. 3) it can be seen that functions 2, 4, 12, and 14 always require a "1" to be stored in cell A. Thus, whenever a "1" occurs on lines D, F, N, or Q, logic circuit 113 must provide a $T = 1$ output. When Y is a "1" and logic functions 5, 8, 11, or 15 are to be performed, a "1" signal must be stored in cell A. When $\bar{Y}$ is a "1" and logic functions 6, 10, 13, or 16 are to be performed, a "1" must be stored in cell A. Logic Equation 9 includes terms to cause a "1" to be stored in logic cell A in all of these cases.

Equation 10 indicates when a "0" is to be stored in cell A. This equation may be determined by inspection from column A of FIG. 3 in the same manner that Equation 9 was derived. Similarly, Equations 11 and 12 can be determined from column B of FIG. 3. The logic circuit illustrated in FIG. 9 is a straight forward implementation of logic Equations 9–12. The implementation is with AND-OR logic. Those skilled in the art will realize that NAND-NOR logic may be used as well.

STRUCTURE OF FIG. 10

FIG. 10 illustrates additional logic circuitry for generating the appropriate pulses to be applied to conductors 20, 22, and 23 to store signals in and interrogate logic cells A and B. Four inputs T–W are illustrated which correspond to outputs T–W of logic circuit 113. The T input is connected to a first input of an OR gate 130 and to the first input of an AND gate 131. The U input is connected to a second input of OR gate 130 and to a first input of an AND gate 132. The V input is connected to a first input of an OR gate 133 and to a first input of an AND gate 134. The W input is connected to a second input of OR gate 133 and to a first input of an AND gate 135. Conductor 116 is connected to second inputs of AND gates 131 and 132. Conductor 116 is further connected to an input of a delay device 136 which has an output connected to second inputs of AND gates 134 and 135. The outputs of AND gates 131 and 134 are connected to first and second inputs of an OR gate 137 which has an output connected to an input of a pulse generator 140. The outputs of AND gates 132 and 135 are connected to first and second inputs of an OR gate 141 which has an output connected to the input of a pulse generator 142. The outputs of pulse generators 140 and 142 are connected to conductor 20.

The output of OR gate 130 is connected to the first input of an AND gate 143. Conductor 116 is connected to a second input of AND gate 143, which has an output connected to a first input of an OR gate 144. The output of OR gate 144 is connected to an input of a pulse generator 145 which has an output connected to conductor 22. An output of OR gate 133 is connected to a first input of an AND gate 146 which has an output connected to a first input of an OR gate 147. The output of delay device 136 is connected to the second input of AND gate 146. The output of OR gate 147 is connected to an input of a pulse generator 148 which has an output connected to conductor 23. As was mentioned above in connection with FIG. 8, drivers 124 and 126 may be included within drivers 114. This combination of the drivers may be made by connecting the output of AND gate 120 to the second input of OR gate 144 and the output of AND gate 121 to the second input of OR gate 147.

OPERATION OF FIGURE 10

As was explained above, if T is a "1," a "1" is to be stored in cell A. To store a "1" in cell A, line 22 must be pulsed with an appropriate pulse and line 20 must be simultaneously pulsed with a bit current. Pulse generator 140 provides a suitable bit current on line 20 to store a "1" in either of cells A or B. Pulse generator 145 provides a suitable pulse on conductor 22 to cause the "1" to be stored in cell A. Similarly, when U is a "1," a "0" is to be stored in cell A. To store a "0" in cell A, pulse generator 145 provides a suitable pulse on conductor 22 and pulse generator 142 provides a suitable bit current for storing a "0" in cell A. Since pulse generator 145 is energized when either a "0" or a "1" is to be stored in cell A, the T and U outputs are combined in OR gate 130. When a start pulse occurs on conductor 116 AND gate 143 provides an output to OR gate 144 which provides an output to energize pulse generator 145. If a "1" is to be stored in cell A, the "1" at the T input is coupled to AND gate 131. The start pulse from conductor 116 causes AND gate 131 to provide an output to OR gate 137 which energizes pulse generator 140. The "1" bit current provided by pulse generator 140 and the pulse provided by pulse generator 145 cause a "1" to be stored in cell A. Similarly, when "0" is to be stored in cell A, pulse generator 145 provides an output pulse on conductor 22 in response to a "1" signal at the U input. The "1" signal at the U input is coupled to AND gate 132 so that upon the occurrence of a start pulse on conductor 116, AND gate 132 provides an output to OR gate 141 to energize pulse generator 142. Pulse generator 142 provides a "0" bit current on conductor 20 to store a "0" signal in cell A.

Since the circuit described in FIG. 10 provides the bit current on conductor 20, the signals must be stored in cells A and B successively. Delay device 136 delays the start pulse on conductor 116 a sufficient time for the storage operation with respect to cell A to be completed. Then delay device 136 provides a pulse to AND gates 134, 135, and 146. Pulse generators 140, 142, and 148 are energized or enabled in accordance with the logic signals at the V and W inputs. When V is a "1," a "1" is to be stored in cell B. The "1" signal at the V input is coupled through OR gate 133 to AND gate 146 and to AND gate 134. The output pulse from delay device 136 causes AND gates 146 and 134 to provide output pulses to pulse generators 146 and 140, respectively. Pulse generator 140 provides a "1" bit current on conductor 20, and pulse generator 148 provides a pulse on conductor 23 to cause a "1" signal to be stored in cell B. Similarly, a "1" signal at the W input causes, upon the occurrence of a pulse from delay device 136, pulse generators 148 and 142 to provide output pulses on conductors 20 and 23 to store a "0" in cell B.

The interrogate signals from X signal generator 12 are applied to the second inputs of OR gates 144 and 147. These signals cause either pulse generator 145 or pulse generator 148 to provide appropriate pulses on conductors 22 and 23 to interrogate storage cells A and B. The interrogate pulses generally may be of the same wave shape as the pulses on conductors 22 and 23 necessary to store signals in cells A and B.

It is to be realized that AND-OR logic has been illustrated for simplicity. NAND-NOR logic may also be used, and in some cases may be preferable. Furthermore, numerous other logic designs will be evident to those skilled in the art. Delay devices 117 and 136 are included for illustrative purposes only. Ordinarily, the start signal applied to terminal 115 would be derived from a system clock. The delay devices may be, for example, counters which count clock pulses and provide a suitable output signal after a predetermined number of clock periods. Pulse generators 140, 142, 145, and 148 are shown as separate circuits. In some cases, OR gates may be available which provide suitable output signals so that the pulse generators may be unnecessary. These variations and modifications and numerous other modifications will be evident to those skilled in the art.

The detailed design of program control 30, logic signal generator 32, and X signal generator 35 of FIG. 4 are not shown. These circuits will be evident to those skilled in the art from an understanding of FIGS. 8–10. The structure of FIG. 8 would generally be suitable for use with FIG. 4 except that driver 114 must provide six outputs. Decoder 112 would generally be the same except that, Since FIGS. 5 and 6 contain only 14 logic functions each, only 14 outputs would be necessary. Thus, two of the possible outputs would not be used. Logic circuit 113 will contain a logic circuit derived from either FIG. 5 or FIG. 6. Logic circuit 113 suitable for use with FIG. 4 may be derived from inspection of either FIG. 5 or FIG. 6 in the same manner that the logic circuit illustrated in FIG. 9 was derived by inspection of FIG. 3.

The above mentioned modifications and variations and many other modifications and variations of this invention may be made. For example, a particular logic array is illustrated in FIG. 7. It is evident that the logic cell shown in FIG. 1 could be used in a system similar to FIG. 7 as well as the logic cell illustrated in FIG. 4. It is also evident that those skilled in the art will realize that this invention can be used in many ways other than those shown and described. For example, in some cases it will be desirable to use the two dimensional array of FIG. 7 to perform complex logic functions. However, the particular example illustrated above could be performed with only one column of logic cells. It is evident that the output from register 95 for each of the subresults could be transmitted back to column 71 each time rather than to columns 75 and 81 in succession. Accordingly, it is evident that those skilled in the art will realize that many modifications and variations can be made within the scope of the appended claims.

I claim as my invention:

1. Programmable logic means for forming functions of a first variable and a second variable comprising, in combination:

a plurality of logic signal storage means arranged along a plated wire;

control means for providing timing signals and signals indicative of the logic function to be performed;

first input means for providing the first variable;

second input means for providing the second variable;

first signal generating means connected to said first input means, to said control means, and to said storage means for storing a signal pattern in said storage means in response to the logic state of said first variable and to the signals from said control means;

second signal generating means connected to said control means, to said storage means, and to said second input means for supplying interrogation signals to a first group of said storage means in response to a first logic state of said second variable and to a second group of said storage means in response to a second logic state of said second variable; and output means connected to said storage means for receiving an output signal in response to said interrogation signals, said output signal being a function of the signal pattern stored in said storage means.

2. Programmable logic means at defined in claim 1 wherein the plurality of logic signal storage means includes a first storage cell and a second storage cell and the second signal generating means supplies an interrogation signal to said first storage cell in response to the first logic state of said second variable and supplies an interrogation signal to said second storage cell in response to the second logic state of said second variable.

3. Programmable logic means at defined in claim 1 wherein the first group of said storage means includes first, second, and third storage cells and the second group of said storage means includes third, fourth, and fifth storage cells, said third storage cell being common to said first and second groups.

4. Programmable logic means as defined in claim 3 wherein the first signal generating means stores one of said first variable and its logical inverse in said third storage cell.

5. Programmable logic means comprising, in combination:

control means;

first signal generating means connected to said control means for receiving therefrom control signals indicative of a logic function to be performed;

first input means for providing a first input variable;

means connecting said first input means to said first signal generating means;

a plurality of signal storage means including a first group and a second group of signal storage means arranged along a plated wire storage medium;

means connecting said first signal generating means to said storage means for programming said storage means in accordance with said control signals and the logic state of said first variable;

second signal generating means connected to said control means for receiving control signals therefrom;

second input means for providing a second input variable;

means connecting said second input means to said second signal generating means;

means connecting said second signal generating means to said storage means for supplying an interrogation signal to said first group of signal storage means when said second variable is in a first logic state and to said second group of signal storage means when said second variable is in a second logic state; and output means connected to said storage means to receive output signals from said storage means, said output signals being indicative of said logic function and of the logic states of said first and second variables.

6. Programmable logic means as defined in claim 5 wherein said first group of signal storage means includes a first storage cell and said second group of signal storage means includes a second storage cell.

7. Programmable logic means as defined in claim 5 wherein said first group of signal storage means includes first, second, and third storage cells and said second group of signal storage means includes third, fourth, and fifth storage cells, said third storage cell being common to said first and second groups.

8. Programmable logic means as defined in claim 7 wherein one of said first variable and its logical inverse is stored in said storage cell.

References Cited
UNITED STATES PATENTS

| | | | |
|---|---|---|---|
| 3,360,787 | 12/1967 | Chang et al. | 340—174 |
| 3,458,714 | 7/1969 | Scovil | 340—174X |

PAUL J. HENON, Primary Examiner

P. R. WOODS, Assistant Examiner

U.S. Cl. X.R.

340—174